May 27, 1952  R. A. HAVENS ET AL  2,598,374
PROCESS OF TREATING TOMATO JUICE
Filed April 21, 1950
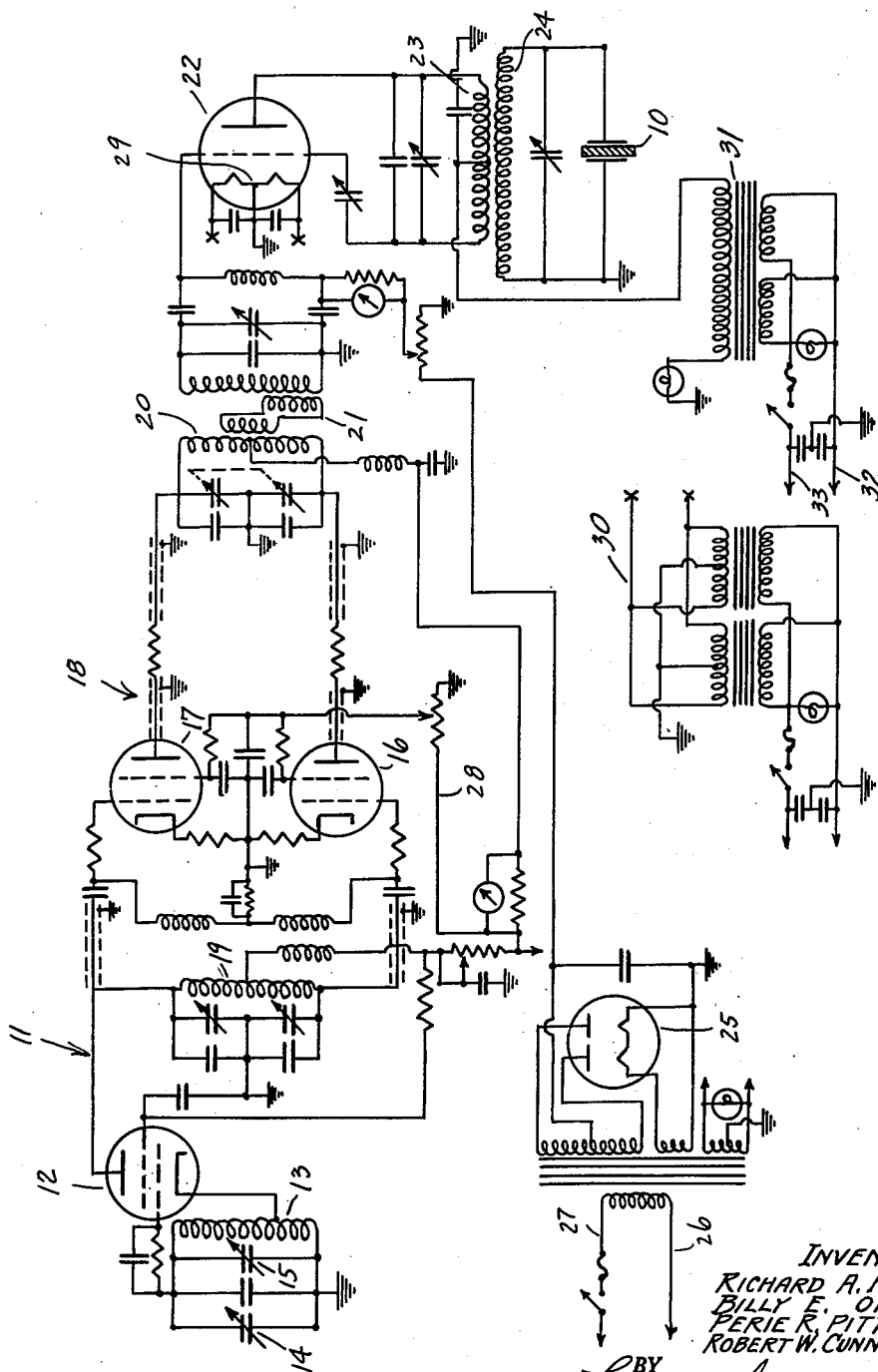
INVENTORS.
RICHARD A. HAVENS.
BILLY E. ORR.
PERIE R. PITTS, JR.
ROBERT W. CUNNINGHAM.
BY
Lockwood, Goldsmith & Galt,
ATTORNEYS.

Patented May 27, 1952

2,598,374

UNITED STATES PATENT OFFICE 2,598,374

PROCESS OF TREATING TOMATO JUICE

Richard A. Havens, Billy E. Orr, Perie R. Pitts, Jr., and Robert W. Cunningham, Indianapolis, Ind.; said Orr, said Pitts, Jr., and said Cunningham assignors to said Havens Application April 21, 1950, Serial No. 157,314

4 Claims. (Cl. 99—2)

The present invention relates to improvements in the method for treating tomato juice for human consumption.

More particularly the invention relates to a method or process for treating tomato juice to produce puree and like liquid and semi-liquid products.

The invention has for one of its objects that of breaking down and disintegrating the cell structure of tomato juice and breaking down the cell walls thereof to produce a gelatinized product. Specifically our method for treating tomato juice products relates to a method for treating tomato juice, in order to gelatinize the same.

More specifically the process contemplates subjecting tomato juice to supersonic sound waves.

In practice, we have found that by subjecting tomato juice to supersonic sound waves having a frequency of approximately from 280 to 300 kilocycles and of sufficient power to penetrate the entire mass, a gelatinized products results having some of the characteristics of the puree, although such a product is much superior to puree. It has a better flavor and is more palatable in all respects.

When tomato juice is subjected to the influence of supersonic sound waves of 280 to 300 kilocycles with a power of 1 kilowatt for one inch of penetration and the sound waves penetrate the entire mass, we find that the cell structure is disintegrated to such an extent and so rapidly that the pectin or pectin-like substance thereof is released in a greater proportion and that the resulting product is a gelatinized like substance of extreme palatability and which is more easily assimilated.

Applicants' process for treating tomato juice therefore comprises generating supersonic sound waves of sufficient power to penetrate tomato juice for an appreciable distance and thereafter subjecting all portions of a mass of tomato juice to these supersonic sound waves with an amplitude sufficient to break a substantial portion of the cell structure of the tomato juice and release the contents of the broken cells, at least partially to gelatinize the treated juice.

The supersonic sound waves may be produced in any manner, although for the purpose of disclosing one apparatus for so producing these sound waves we have disclosed in the accompanying drawing an apparatus for producing sound waves having a frequency of approximately 280 to 300 kilocycles.

The full nature of the invention will be understood from the accompanying drawings and the following description and claims:

The figure is a diagrammatic view of the circuit arrangement of an apparatus for producing supersonic sound waves electrically.

In the apparatus illustrated, the supersonic sound waves are produced by a quartz disc 10 which may be of any of the present recognized commercial types. This disc in the specific structure illustrated is about 3.8 cm. in diameter by about 1.0 cm. in thickness. This disc is tuned to a radio frequency of 281.41 kilocycles.

The disc is energized from a radio frequency source comprising an electronic oscillator indicated generally at 11 which is tuned to the resonance, in this instance, of the disc 10. This oscillator includes a tube 12 whose operating frequency is determined by the inductance 13 and the capacitors 14 and 15.

This tube 12 feeds the type 807 tubes 16 and 17 of a high voltage radio frequency circuit indicated generally at 18 and including not only the tubes 16 and 17 but also the phase inverter 19 together with the capacitors associated therewith.

The radio frequency energy developed by the circuit 18 is delivered to a tank circuit 20 coupled through the link 21 to the circuit of the power amplifier tube 22 which may be of the 304TL type.

The amplifier tube output is developed in tank 23 which is coupled through the winding 24 to the crystal 10.

The negative bias for the tube 22 is provided by a circuit including the tube 25 which is supplied by power from a 117 volt alternating current source supplied through the conductors 26 and 27.

600 to 700 volt D. C. power is supplied to the radio frequency circuit through connection 28 with a source of direct current power while the heater 29 is supplied through the circuit indicated generally at 30 in turn supplied with the 117 volt alternating current from the same lead 26 and 27. The plate power for the tube 22 is supplied from the plate transformer 31 in turn supplied from a suitable alternating current power supply connected by the leads 32 and 33 as indicated.

The invention claimed is:

1. The process of treating tomato juice which comprises: generating supersonic sound waves of sufficient power to penetrate tomato juice for an appreciable distance and thereafter subjecting all portions of a mass of tomato juice to said supersonic sound waves with an amplitude sufficient to break a substantial portion of the cell structure of said tomato juice and release the contents of the broken cells, at least partially to gelatinize the treated juice.

2. The process of treating tomato juice which comprises: generating sonic waves having a frequency at least several times greater than the highest audible frequency and of sufficient power to penetrate tomato juice for an appreciable distance and thereafter subjecting all portions of a mass of tomato juice to said supersonic sound waves with an amplitude sufficient to break a substantial portion of the cell structure of said tomato juice and release the contents of the broken cells, at least partially to gelatinize the treated juice.

3. The process of treating tomato juice which comprises: generating supersonic sound waves of sufficient power to penetrate tomato juice for an appreciable distance and thereafter simultaneously subjecting all portions of a specific mass of tomato juice to be treated to said supersonic sound waves with an amplitude sufficient to break a substantial portion of the cell structure of said mass and release the contents of the broken cells, at least partially to gelatinize the tomato juice.

4. The process of treating tomato juice which comprises: generating supersonic sound waves of sufficient power to penetrate tomato juice for an appreciable distance and thereafter subjecting all portions of a mass of tomato juice to said supersonic sound waves to break a portion of the cell structure of said tomato juice and release the contents of the broken cells, which portion is sufficient to cause said tomato juice to have the consistency of heat-processed tomato puree.

RICHARD A. HAVENS.
BILLY E. ORR.
PERIE R. PITTS, Jr.
ROBERT W. CUNNINGHAM.

REFERENCES CITED

The following references are of record in the file of this patent:

UNITED STATES PATENTS

| Number | Name | Date |
|---|---|---|
| 1,738,565 | Claypoole | Dec. 10, 1929 |
| 1,863,222 | Hoermann | June 14, 1932 |
| 2,086,891 | Bachmann | July 13, 1937 |
| 2,163,650 | Weaver | June 29, 1939 |
| 2,193,622 | Coulter | Mar. 12, 1940 |
| 2,448,372 | Horsley | Aug. 31, 1948 |